(12) United States Patent
Metke et al.

(10) Patent No.: US 10,104,526 B2
(45) Date of Patent: Oct. 16, 2018

(54) METHOD AND APPARATUS FOR ISSUING A CREDENTIAL FOR AN INCIDENT AREA NETWORK

(71) Applicant: MOTOROLA SOLUTIONS, INC., Schaumburg, IL (US)

(72) Inventors: Anthony R. Metke, Naperville, IL (US); Adam C. Lewis, Buffalo Grove, IL (US); Shanthi E. Thomas, Hoffman Estates, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 142 days.

(21) Appl. No.: 15/170,683

(22) Filed: Jun. 1, 2016

(65) Prior Publication Data

US 2017/0353451 A1 Dec. 7, 2017

(51) Int. Cl.
*H04W 4/90* (2018.01)
*H04L 29/06* (2006.01)

(52) U.S. Cl.
CPC .......... *H04W 4/90* (2018.02); *H04L 63/08* (2013.01); *H04L 63/0876* (2013.01); *H04L 63/10* (2013.01); *H04L 63/102* (2013.01)

(58) Field of Classification Search
CPC .................. H04L 63/0876; H04L 63/102
See application file for complete search history.

(56) References Cited

U.S. PATENT DOCUMENTS

| | | | | |
|---|---|---|---|---|
| 6,609,197 B1 * | 8/2003 | Ketcham | ............... | H04L 41/08 380/264 |
| 6,769,767 B2 * | 8/2004 | Swab | ............... | H04W 56/0015 351/158 |
| 7,034,678 B2 * | 4/2006 | Burkley | ............... | G01S 5/0027 340/539.13 |
| 7,091,851 B2 * | 8/2006 | Mason | ............... | G01S 5/0027 340/539.13 |
| 7,137,002 B2 * | 11/2006 | Goldman | ............... | H04M 3/382 713/170 |
| 7,149,499 B1 * | 12/2006 | Oran | ............... | H04M 11/04 455/404.2 |
| 7,245,216 B2 * | 7/2007 | Burkley | ............... | H04W 4/90 340/539.13 |

(Continued)

OTHER PUBLICATIONS

PCT/US2017/030430 International Search Report and Written Opinion of the International Searching Authority dated Jul. 19, 2017 (13 pages).

(Continued)

*Primary Examiner* — David Garcia Cervetti
(74) *Attorney, Agent, or Firm* — Michael Best & Friedrich LLP

(57) ABSTRACT

A method and apparatus for issuing an incident-issued credential for an incident area network. One embodiment provides an identity server including an electronic processor configured to receive an agency-issued credential and retrieve a first set of attributes from the agency-issued credential. The electronic processor is also configured to map the first set of attributes to a scope of a service available through an incident area network. The electronic processor is further configured to generate the incident-issued credential for the incident area network including the scope and issue the incident-issued credential to a user device.

20 Claims, 6 Drawing Sheets

(56) References Cited

U.S. PATENT DOCUMENTS

| | | | | |
|---|---|---|---|---|
| 7,581,096 B2* | 8/2009 | Balfanz | H04L 12/1822 | 380/255 |
| 7,937,089 B2* | 5/2011 | Smetters | G08C 17/00 | 455/452.1 |
| 8,090,944 B2* | 1/2012 | Lee | G06F 21/32 | 379/243 |
| 8,528,063 B2 | 9/2013 | Duggan et al. | | |
| 8,665,087 B2* | 3/2014 | Greene | A62B 99/00 | 340/539.11 |
| 8,942,247 B1* | 1/2015 | Alapuranen | H04W 60/00 | 370/401 |
| 9,215,286 B1* | 12/2015 | Schilit | H04L 67/22 | |
| 9,332,002 B1* | 5/2016 | Bowen | H04L 63/0823 | |
| 9,378,378 B2* | 6/2016 | Arenburg | G06F 21/60 | |
| 9,640,068 B2* | 5/2017 | Greene | H04W 28/14 | |
| 9,706,376 B2* | 7/2017 | Fletcher | H04W 4/90 | |
| 9,779,174 B2* | 10/2017 | Sheik Adam | H04L 63/0407 | |
| 9,813,883 B2* | 11/2017 | Michaelis | H04W 4/90 | |
| 9,843,915 B2* | 12/2017 | Bohlander | H04W 4/22 | |
| 9,942,695 B2* | 4/2018 | Goad | H04W 4/008 | |
| 2002/0083332 A1* | 6/2002 | Grawrock | G06F 21/445 | 726/26 |
| 2002/0191635 A1* | 12/2002 | Chow | H04L 12/2801 | 370/463 |
| 2004/0098581 A1* | 5/2004 | Balfanz | H04L 12/1818 | 713/155 |
| 2004/0107366 A1* | 6/2004 | Balfanz | H04L 12/1822 | 726/5 |
| 2004/0192353 A1* | 9/2004 | Mason | G01S 5/0027 | 455/457 |
| 2004/0209617 A1* | 10/2004 | Hrastar | H04W 24/00 | 455/434 |
| 2004/0268119 A1* | 12/2004 | Smetters | H04L 9/00 | 713/155 |
| 2005/0001720 A1* | 1/2005 | Mason | G01C 21/206 | 340/539.13 |
| 2005/0017070 A1* | 1/2005 | Miller | G06K 17/00 | 235/380 |
| 2005/0021946 A1* | 1/2005 | Narayanan | H04L 45/00 | 713/163 |
| 2005/0129240 A1* | 6/2005 | Balfanz | H04L 63/06 | 380/270 |
| 2005/0223413 A1 | 10/2005 | Duggan et al. | | |
| 2005/0232284 A1* | 10/2005 | Karaoguz | H04L 12/66 | 370/401 |
| 2005/0265256 A1* | 12/2005 | Delaney | H04W 92/02 | 370/254 |
| 2005/0268111 A1* | 12/2005 | Markham | G06F 21/35 | 713/186 |
| 2006/0161967 A1* | 7/2006 | Dawson | H04L 63/126 | 726/2 |
| 2007/0120671 A1* | 5/2007 | Carmichael | A62C 99/00 | 340/572.1 |
| 2008/0070554 A1* | 3/2008 | Rollender | H04W 4/90 | 455/414.1 |
| 2008/0194246 A1* | 8/2008 | Klein | H04W 8/082 | 455/422.1 |
| 2008/0317218 A1* | 12/2008 | Connell, II | G06Q 10/063112 | 379/45 |
| 2009/0132813 A1* | 5/2009 | Schibuk | G06Q 20/223 | 713/158 |
| 2009/0150209 A1* | 6/2009 | Levine | G06Q 10/06 | 705/7.13 |
| 2009/0174547 A1* | 7/2009 | Greene | A62B 99/00 | 340/539.13 |
| 2009/0207852 A1* | 8/2009 | Greene | H04W 28/14 | 370/465 |
| 2009/0239503 A1* | 9/2009 | Smeets | H04L 63/06 | 455/411 |
| 2009/0276841 A1* | 11/2009 | Guo | H04L 63/0823 | 726/12 |
| 2009/0285401 A1* | 11/2009 | Moroney | G06Q 30/06 | 380/278 |
| 2010/0048161 A1* | 2/2010 | He | H04W 4/90 | 455/404.1 |
| 2010/0262668 A1* | 10/2010 | Piett | H04W 4/90 | 709/206 |
| 2010/0278315 A1* | 11/2010 | Goldman | H04M 11/04 | 379/45 |
| 2012/0102522 A1* | 4/2012 | Long | H04W 76/50 | 725/33 |
| 2012/0136923 A1* | 5/2012 | Grube | H04W 4/90 | 709/203 |
| 2012/0218075 A1* | 8/2012 | Hill | G07C 9/00103 | 340/5.61 |
| 2012/0221695 A1* | 8/2012 | Rose | G07C 9/00103 | 709/223 |
| 2012/0302200 A1* | 11/2012 | Esbensen | H04W 4/90 | 455/404.2 |
| 2013/0332727 A1* | 12/2013 | Jaudon | H04L 63/0807 | 713/159 |
| 2014/0165165 A1* | 6/2014 | Story, Jr. | H04L 63/08 | 726/6 |
| 2014/0189827 A1* | 7/2014 | Popovich | H04W 12/06 | 726/6 |
| 2014/0247708 A1* | 9/2014 | Knox | H04W 28/08 | 370/216 |
| 2014/0282934 A1* | 9/2014 | Miasnik | G06F 17/30861 | 726/5 |
| 2014/0298407 A1 | 10/2014 | McClain et al. | | |
| 2015/0095999 A1* | 4/2015 | Toth | H04L 63/08 | 726/6 |
| 2015/0208223 A1* | 7/2015 | Miller | G06Q 10/06 | 455/404.1 |
| 2015/0282061 A1* | 10/2015 | Matthews | H04W 4/046 | 455/404.2 |
| 2016/0048571 A1* | 2/2016 | Davidson | G06F 17/30589 | 707/741 |
| 2016/0335116 A1* | 11/2016 | Ishii | G06F 9/466 | |
| 2016/0337828 A1* | 11/2016 | Michaelis | H04W 4/90 | |
| 2016/0337829 A1* | 11/2016 | Fletcher | H04W 4/90 | |
| 2016/0350751 A1* | 12/2016 | Keys | G06Q 20/3829 | |
| 2017/0024088 A1* | 1/2017 | La Pean | G06Q 50/265 | |
| 2017/0076228 A1* | 3/2017 | Emami | G06Q 10/02 | |
| 2017/0134923 A1* | 5/2017 | Kuznetsov | H04W 4/90 | |
| 2017/0161438 A1* | 6/2017 | Connery | G06Q 50/24 | |

OTHER PUBLICATIONS

O'Neill, "Identity Bridge: How an API Gateway bridges OAuth, JWT, SAML and X.509," website article, Aug. 14, 2015, 3 pages, https://www.linkedin.com/pulse/identity¬bridge¬how¬api¬gateway¬bridges¬oauth¬jwt¬saml¬mark¬o¬neill.

* cited by examiner

| FIRST SET OF ATTRIBUTES | | SECOND SET OF ATTRIBUTES | | |
|---|---|---|---|---|
| | | HIGH | MEDIUM | BASIC |
| O = CHICAGO PD, OU=SWAT, TYPE= FIRST RESPONDER, RANK= LIEUTENANT | TRAINING = ICS-100, 200, 300, 400, FEMA IS-700, 800 EXPERIENCE= MUTUAL AID, OSC, PSC PHYSICAL FITNESS = CERTIFIED | SCOPE=IDP, RTVI, CONTEXT ICS ROLE= INCIDENT COMMAND, OPERATIONS SECTION CHIEF, ADDITIONAL ATTRIBUTES: SWORN LAW ENFORCEMENT OFFICER, NCIC CERTIFIED | SCOPE=RTVI, ICS ROLE= INCIDENT COMMAND, OPERATIONS SECTION CHIEF, PLANNING SECTION CHIEF | SCOPE = RTVI ICS ROLE = INCIDENT COMMAND |
| O = Chicago PD, OU=Investigation, TYPE=First Responder, RANK=Detective | TRAINING = ACCIDENT INVESTIGATION, ICS-100, 200, 300, 400, FEMA IS-700, 800 LANGUAGES KNOWN = ENGLISH, SPANISH | SCOPE=IDP, RTVI, CONTEXT ICS ROLE= TYPE 3 SAFETY OFFICER | SCOPE=RTVI, ICS ROLE= TYPE 3 SAFETY OFFICER | SCOPE = RTVI ICS ROLE = TYPE 2 SAFETY OFFICER |
| O = DuPage County Sheriff's Office, OU=Operations, TYPE= First Responder RANK = Deputy Sheriff | TRAINING = FIRE SUPPRESSION, HAZMAT, OSHA, ICS-100, 200,300,400, FEMA IS-700, 800 EXPERIENCE = WILD FIRE, HAZMAT | SCOPE=IDP, RTVI, CONTEXT ICS ROLE= SAFETY OFFICER | SCOPE=RTVI, ICS ROLE= SAFETY OFFICER | SCOPE = RTVI ICS ROLE = SAFETY OFFICER |

METHOD AND APPARATUS FOR ISSUING A CREDENTIAL FOR AN INCIDENT AREA NETWORK

BACKGROUND OF THE INVENTION

Identity management generally refers to managing the authentication, authorization, and rights of users and user devices within a computing environment. For example, a computing environment may include backend infrastructure that controls what users and user devices may access services available through the computing environment and what rights such user devices have when accessing the services.

During a public safety incident, a computing environment may be deployed to provide services to public safety personnel handling the incident. This computing environment may be referred to as an incident area network. An incident area network may support users and user devices associated with multiple different agencies and the number of users and user devices needing access to the incident area network may change rapidly. To authenticate and authorize these users and user devices, the incident area network would normally need access to the backend infrastructure for each agency. However, in many situations, an incident area network is operated in a disconnected mode where the network does not have access to other computing environments. Furthermore, duplicating backend infrastructure at the incident area network may not be feasible due to time, resource, and security constraints. Therefore, it may be challenging for the incident area network to authenticate and authorize users and user devices.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 4 illustrates an example mapping table in accordance with some embodiments.

Figure 1:
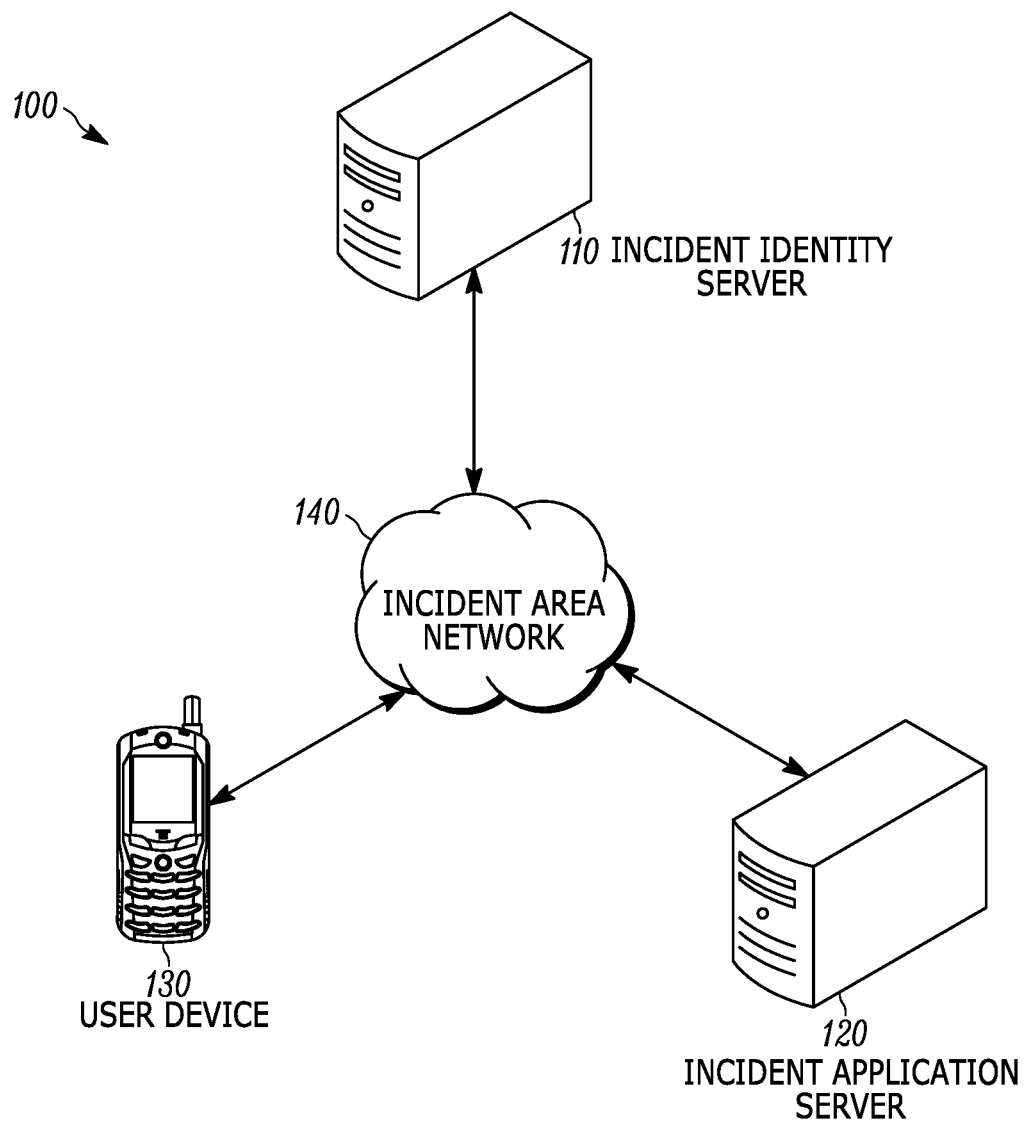
FIG. 1 is a block diagram of a system for performing incident area identity management in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One embodiment provides an identity server including an electronic processor configured to receive an agency-issued credential and retrieve a first set of attributes from the agency-issued credential. The electronic processor is also configured to map the first set of attributes to a scope of service available through an incident area network. The electronic processor is further configured to generate an incident-issued credential for the incident area network including the scope and issue the incident-issued credential to a user device.

Another embodiment provides an identity server comprising an electronic processor configured to receive an agency-issued credential and retrieve a first set of attributes from the agency-issued credential. The electronic processor is also configured to map the first set of attributes to a second set of attributes based on a context of an incident associated with an incident area network. The electronic processor is further configured to generate an incident-issued credential for the incident area network associated with the incident including the second set of attributes and issue the incident-issued credential to a user device.

Yet another embodiment provides a method of issuing an incident-issued credential for an incident area network including receiving, with an identity server, an agency-issued credential. The method also includes retrieving, with the identity server, a first set of attributes from the agency-issued credential and mapping the first set of attributes to a second set of attributes based on a context of an incident associated with the incident area network. The method further includes generating the incident-issued credential for the incident area network based on the second set of attributes and issuing, with the identity server, the incident-issued credential to a user device.

FIG. 1 is a block diagram of a system 100 for performing incident area identity management according to one embodiment. The system 100 may include an incident identity server 110, an incident application server 120, and a user device 130 communicating over an incident area network 140. FIG. 1 illustrates only one example embodiment of the system 100, and the system 100 may include additional or fewer components in configurations different from the system 100 illustrated in FIG. 1. For example, a plurality of incident identity servers 110, a plurality of incident application servers 120, a plurality of user devices 130, or a combination thereof may communicate over the incident area network 140.

The incident area network 140 may be a wired or wireless communication network, such as a cellular network, a land mobile radio (LMR) network, or the like. Portions of the incident area network 140 may be implemented using a wide area network, such as the Internet, a local area network, such as a Bluetooth™ network or Wi-Fi, and combinations or derivatives thereof. The incident area network 140 may be used by organizations, such as public safety organizations, to provide services to users associated with an incident, such as a public safety incident.

The incident application server 120 hosts one or more computer-based services, such as software applications and application programming interfaces (APIs). For example, the incident application server 120 may be an e-mail server that provides an e-mail application to the user device 130. In other embodiments, the incident application server 120 hosts a database accessible through an application programming interface. In other embodiments, the incident application server 120 hosts a website that provides webpages. For example, in some embodiments, the incident application server 120 hosts a collection of representation state transfer (REST) based micro-services that are called by the user device 130. Also, in some embodiments, the incident application server 120 may communicate with a second application server. In some embodiments, the incident application server 120 includes a server that provides application services and at least one of a proxy, a reverse proxy, a firewall, an application programming interface gateway, and a policy enforcement point. In these embodiments, the proxy, the reverse proxy, the firewall, the application programming interface gateway, and the policy enforcement point may receive application requests from the user device 130 and make an appropriate access control decision before passing the request to the sever providing application services.

The user device 130 accesses the computer-based services hosted by the incident application server 120 over the incident area network 140. The user device 130 may be a handheld device, such as a mobile telephone, a smart telephone, a tablet computer, a mobile two-way radio, a smart watch or other wearable, and the like configured to communicate over the incident area network 140. For example, in some embodiments, the user device 130 may be a handheld cellular telephone carried by public safety personnel, such as a police officer. Alternatively, the user device 130 may be a computing device, such as a personal computer, a laptop computer, a tablet computer, and the like. For example, in some embodiments, the user device 130 may be a laptop computer mounted in a police car. Accordingly, the user device 130 may be any type of device capable of communicating over the incident area network 140.

The incident identity server 110 performs identity management functions for the incident area network 140. The incident identity server 110 may be located at the incident associated with the incident area network 140. As described in more detail below, the incident identity server 110 authenticates and authorizes users and user devices accessing the incident area network 140 and issues credentials for use with the incident area network 140. As used herein, the term "credential" includes tokens, assertions, digital certificates, cookies, certifications, passwords, user names, keys, and other objects issued to a user or a user device that specify the user or user device's authenticity, authority, rights, or a combination thereof. In some embodiments, the incident identity server 110 issues credentials using a standard identity management mechanisms, such as the security assertion markup language (SAML), OAuth, OpenID, and the like.

Figure 2:
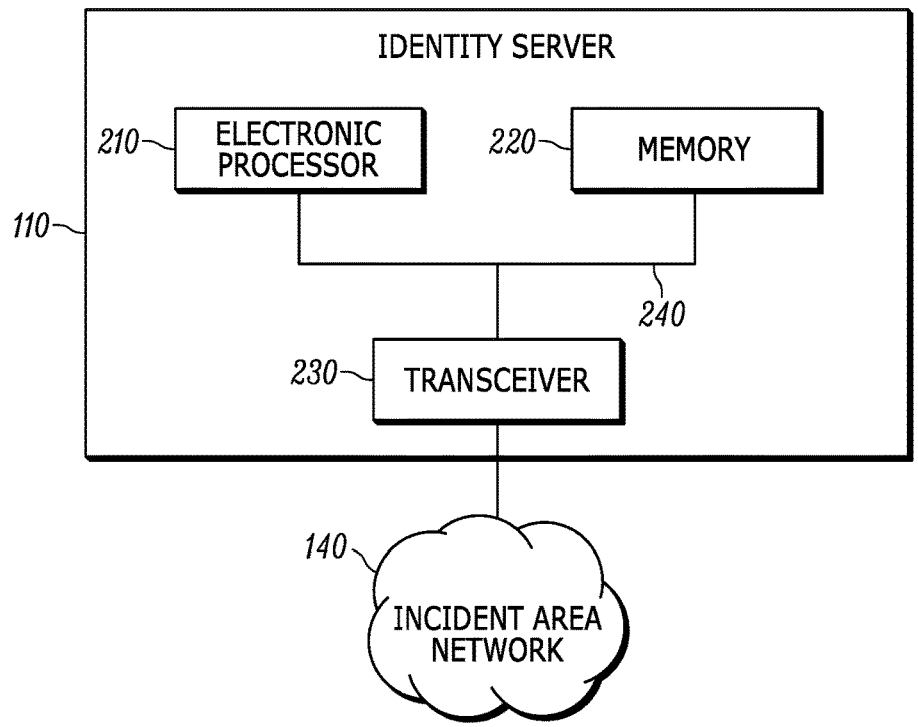
FIG. 2 is a block diagram of an identity server communicating with the incident area network of FIG. 1 in accordance with some embodiments.

FIG. 2 is a block diagram of the incident identity server 110 according to one embodiment. As illustrated in FIG. 2, the incident identity server 110 includes an electronic processor 210 (for example, a microprocessor, application-specific integrated circuit (ASIC), or another suitable electronic device), a memory 220 (for example, a non-transitory, computer-readable storage medium), and a transceiver 230. The electronic processor 210, the memory 220, and the transceiver 230 communicate over one or more communication lines or buses, such as a communication bus 240. The incident identity server 110 may include additional or fewer components in configurations different from the incident identity server 110 illustrated in FIG. 2. Also, in some embodiments, the incident identity server 110 performs functionality in addition to the functionality described herein. Similarly, the functionality performed by the incident identity server 110 through the execution of instructions by the electronic processor 210 may be distributed among multiple electronic processors included in the incident identity server 110 or other devices. Accordingly, functionality described herein as being performed by the electronic processor 210 may be performed by one or more electronic processors included in the incident identity server 110 or external to the incident identity server 110.

The electronic processor 210 executes instructions stored in the memory 220 to perform identity management functions. In particular, the electronic processor 210 executes instructions to perform the method illustrated in FIG. 3. The transceiver 230 communicates over the incident area network 140. For example, in some embodiments, the transceiver 230 wirelessly transmits and wirelessly receives data over the incident area network 140. In particular, the transceiver 230 may receive data from and transmit data to the user device 130, the incident application server 120, or both. In other embodiments, rather than including the transceiver 230, the incident identity server 110 may include separate transmitting and receiving components, such as a transmitter and a receiver. In some embodiments, the transceiver 230 communicates with communication networks other than the incident area network 140. For example, in some embodiments, the incident identity server 110 includes a plurality of transceivers for communicating with a plurality of communication networks including the incident area network 140.

Before or after being included in the system 100, the user device 130 may be issued an agency-issued credential. For example, the user device 130 may provide an agency identity server with identifying information of a user operating the user device 130 (such as a username and a password), identifying information of the user device 130 (such as a unique serial number, a model number, data processing capabilities, and the like), or a combination thereof. The agency identity server verifies the identifying information (e.g., by accessing backend infrastructure, such as a database of authorized users, user devices, or the combination thereof), and, when the identifying information is verified, the agency identity server issues an agency-issued credential, such as a digital certificate (a X.509 digital certificate), a token, or the like, to the user device 130. The user device 130 stores the credential in a local memory. In some embodiments, the agency-issued credential is digitally signed by the agency identity server, which, as described below, allows other devices to verify the credential. Digitally signing a credential also prevents forgery, as the signature may only be replicated with secret data, such as a private encryption key, of the agency identity server. Also, in some embodiments, the agency-issued credential includes an expiration.

For example, within the public safety industry, an agency, such as a police department, an intelligence or security service, a group of first responders, and the like, may operate a computing environment and may issue authorized users of the computing environment with agency-issued credentials through the agency identity server. Accordingly, an agency-issued credential may include a plurality of attributes that identify a user and the user's role within the agency. For example, an agency-issued credential may include an identifier of an agency that a user works for, a rank of the user, and qualifications, experiences, and certifications (for example, incident command system (ICS) functions, Federal Emergency Management Agency (FEMA) independent study (IS), and the like) of the user. An agency-issued credential may also include a scope that defines rights of the user for particular computer-based services (for example, data access rights, service access rights, and the like). In addition, the agency-issued credential may include information identifying the user device 130, such as the serial number of the user device 130. For example, in some embodiments, the agency identity server may issue a credential associated with the user device 130 and a separate credential associated with the user operating the user device 130. In other embodiments, the agency identity server may issue a credential that authenticates both the user device 130 and the user operating the user device 130.

After the user device 130 receives the agency-issued credential from the agency identity server, the user device 130 may submit the agency-issued credential to prove its identity and authorization to other devices. For example, when the user device 130 wants to access a computer-based service, the user device 130 transmits the agency-issued credential to an application server hosting the service, and the application server uses the credential to verify the identity of the user device 130 or the user operating the user device 130 and determine whether the user device 130 or the user is authorized to use the service and any restrictions on such use. In some embodiments, this authorization occurs at a proxy, a reverse proxy, a firewall, an application program interface (API) gateway or a policy enforcement point which may be independent or co-resident with the application server. For example, an application server may host one or a plurality of services that are accessible to user devices. However, before the user device 130 may access a service, an application server may authenticate the user device 130 and/or the associated user through the agency-issued credential. An application server may also use the agency-issued credential to determine what rights to grant the user device 130. For example, the services accessible through the application server may include different levels of access (e.g., read only, read and write, and the like). In some embodiments, an application server communicates with the agency identity server that issued the agency-issued credential (or other backend infrastructure initially accessed to issue the agency-issued credential) to verify the identity of the user device or the associated user and obtain authorization and rights for the user device or the associated user.

As also described above, in some embodiments, a computing environment is deployed to handle an incident, such as a public safety incident. The deployed network may be referred to as an incident area network (for example, the incident area network 140). An incident area network may be used by user devices operated by users associated with different agencies. Furthermore, the incident area network may be operated in a disconnected or offline mode where the incident area network does not have remote access to other computing environments, such as the computing environments associated with each agency using the incident area network. Therefore, the incident area network may not have access to remote computing environments to access backend infrastructure, such as the agency identity server, for authenticating and authorizing user devices and associated users accessing the incident area network.

Accordingly, returning to FIG. 1, the incident identity server 110 may be configured to receive an agency-issued credential from user device 130, authenticate the user device 130 using the agency-issued credential (without the benefit of or access to backend infrastructure, such as the agency incident server described above), and issue an incident-issued credential for the incident area network 140 by mapping attributes in the agency-issued credential to attributes relevant to the incident associated with the incident area network 140. For example, FIG. 3 is a flowchart illustrating a method 400 performed by the incident identity server 110 (the electronic processor 210) for issuing an incident-issued credential for the incident area network 140.

Figure 3:
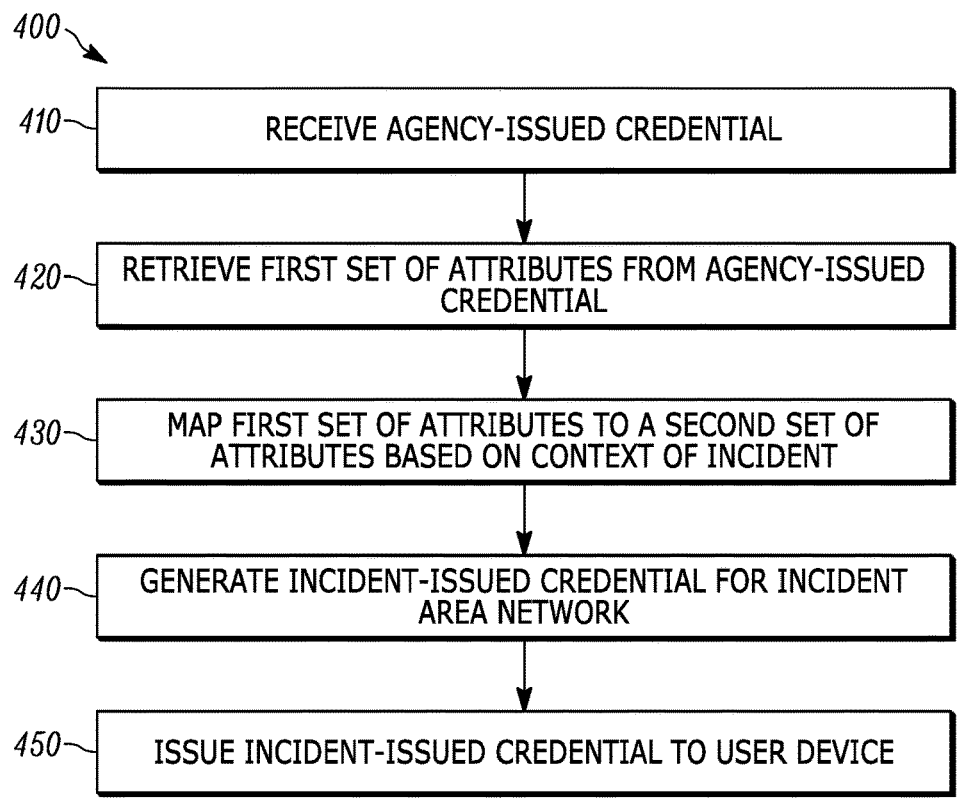
FIG. 3 is a flowchart of a method of issuing a credential for the incident area network of FIG. 1 with the identity server of FIG. 2 in accordance with some embodiments.

As illustrated in FIG. 3, the method 400 includes receiving an agency-issued credential at the incident identity server 110 (at block 410). For example, the incident identity server 110 may receive the agency-issued credential from the user device 130 over the incident area network 140. In particular, as described above, the user device 130 may receive and store an agency-issued credential, such as an X.509 digital certificate from an agency identity server. The agency-issued credential may include a subject distinguished name (DN) attribute that contains identifying information about the entity to which the credential was issued (for example, the user device 130, one or more users operating the user device, or both), a subject alternative name attribute, a subject directory attribute, a certificate policy (CP) object identifier (OID) attribute, and the like. The agency-issued credential may also include other attributes, such as an organization (represented by the attribute "O"), an organizational unit (represented by the attribute "OU"), a type, a rank, experiences, training, physical fitness, languages, and the like.

In some embodiments, the incident identity server 110 optionally authenticates the user device 130 (or the user operating the user device) based on the agency-issued credential (not shown). For example, the incident identity server 110 may identify an issuer of the agency-issued credential (for example, an agency) and determine whether the issuer has been authorized to use the incident area network 140 or services available on the incident area network 140. In particular, the incident identity server 110 may check a signature of the agency-issued credential when the agency-issued credential is digitally signed. In some embodiments, the incident identity server 110 may also evaluate other attributes included in the agency-issued credential to authenticate whether the credential is original (not forged), current (not expired), and represents an authorized agency or user.

As illustrated in FIG. 3, the incident identity server 110 also retrieves a first set of attributes from the agency-issued credential (at block 420). As described above, the agency-issued credential includes a first set of attributes. The first set of attributes may include attributes associated with the user of the user device 130, the user device 130, or both. For example, in some embodiments, the incident identity server 110 receives one agency-issued credential that includes attributes associated with the user of the user device 130, the user device 130, or both, and, in other embodiments, the incident identity server 110 receives two agency-issued credentials, wherein a first agency-issued credential includes attributes associated with the user of the user device 130 and a second agency-issued credential includes attributes associated with the user device 130 (for example, a third set of attributes). The attributes associated with the user of the user device 130 may include a rank of the user, a level of capability of the user, a level of qualification of the user, and a level of training of the user and the attributes associated with the user device 130 may include data processing capabilities (such as encryption or other security capabilities) of the user device 130, such as a type of the user device, a model number of the user device, an overall assurance level of the user device 130, an assurance level of the provisioning of the user device 130, an assurance level associated with the capabilities of the user device 130, and a security capability of the user device.

The incident identity server 110 maps the first set of attributes to a second set of attributes (at block 430). For example, the incident identity server 110 may store (in the memory 220) a plurality of mapping rules. The mapping rules may define what agencies may access the incident area network 140 and what attributes should be included in an incident-issued credential issued by the incident identity server 110. Examples of mapping rules (in pseudo code format) are provided below.

If ORGANIZATION="CPD" and RANK="Lieutenant," then assign ROLE="Lieutenant"
If ORGANIZATION="NYPD" and RANK="Detective," then assign ROLE="Lieutenant"
If ORGANIZATION="County Sheriff" and RANK="Deputy Sheriff," then assign ROLE="Lieutenant"
If QUALIFICATIONS includes ICS-400, then assign ICS_ROLE_ELIGIBLE="Incident Commander"
If QUALIFICATIONS includes ICS-200, then assign ICS_ROLE_ELIGIBLE="Section Chief"
If QUALIFICATIONS includes HAZMAT, then assign ICS_ROLE_ELIGIBLE="Hazmat Technician"
If QUALIFICATIONS includes HAZMAT and FEMA-IS-700, then assign ICS_ROLE_ELIGIBLE="HAZMAT SAFETY OFFICER"

As noted above, the agency-issued credential may include attributes associated with the user device 130, the user operating the user device 130, or both. Therefore, in some embodiments, the incident identity server 110 may use attributes associated with the user device 130, the user operating the user device 130, or both to determine the second set of attributes. For example, the mapping rules applied by the incident identity server 110 may use attributes associated with the user operating the user device 130, the user device 130, or both to determine the second set of attributes. Also, when agency-issued credential received by the incident identity server 110 does not include particular attributes referenced by the mapping rules, the incident identity server 110 may prompt the user device 130 for this information. For example, when the agency-issued credential received by the incident identity server 110 is associated with the user of the user device 130 but not the user device, the incident identity server 110 may request data identifying the user device 130 (as a request for a separate credential for the user device 130 or as a request for data identifying the user device 130 not included in credential). Accordingly, the incident identity server 110 may determine the second set of attributes based on attributes retrieved from a plurality of credentials (for example, a first credential associated with a user operating the user device 130 and a second credential associated with the user device 130).

In some embodiments, the incident identity server 110 uses data identifying the user device 130, such as a separate credential (for example, a second agency-issued credential) associated with the user device 130, to determine whether the user device 130 is an agency-issued or agency-approved device. For example, when user device 130 is not an agency-issued or agency-approved device, the user device 130 may not include particular functionality or capability, such as encryption capabilities, that may be required to provide a user operating the user device 130 with particular rights.

In some embodiments, the incident identity server 110 also uses the mapping rules to define a scope. As noted above, the scope may define the rights of a particular user or user device. Accordingly, the mapping rules may map attributes from the agency-issued certificate to a scope for the credential associated with the incident area network 140. Examples of mapping rules for defining a scope of a new credential (in pseudo code format) are provided below.

If attribute "Incident Command," than assign scope "ComandCentral(ALL)"
If attribute "Hazmat-*," then assign scope "CommandCentral(Hazmat)"

In the above example mapping rules, the presence of any attribute with a value of "Incident Command" or "Hazmat" defines a particular scope for the credential. Accordingly, in some embodiments, the mapping rules for scope do not merely look at the corresponding scope from the received agency-issued credential to define the scope for the new credential. Rather, the mapping rules consider other (non-scope) attributes included in the agency-issued certificate to define the scope for the new credential. In some embodiments, the incident identity server 110 may also use values from the second set of attributes to define the scope.

The mapping rules may be different based on the type of incident associated with the incident area network 140 (for example, different rules for a high-rise fire than for a chemical spill in a residential area). Also, in some embodiments, the rules may change dynamically based on incident context. For example, the mapping rules may change based on a type of the incident, a size of the incident, a condition of the incident, a location of the incident, a time of day, number of resources at the incident, type of resources at the incident, any needed but missing resources at the incident. In particular, the mapping rules may map more users to hazmat roles during a chemical spill than during a fire. Furthermore, as a chemical spill grows, the mapping rules may map more users to hazmat roles and may grant these users more access rights than when the chemical spill was more contained.

As an alternative or in addition to using mapping rules, the incident identity server 110 may apply a mapping table or function to create the second set of attributes. For example, FIG. 4 illustrates an example mapping table 450 (in human readable format) that the incident identity server 110 may use to map the first set of attributes to the second set of attributes. As illustrated in FIG. 4, in some embodiments, different values for the second set of attributes may be defined based on a context of the incident. For example, when the context of the incident demands a high degree of security or management, the second set of attributes may be defined as represented in the "High" column. Similarly, when the context of the incident demands a medium degree of security or management, the second set of attributes may be defined as presented in the "Medium" column, and when the context of the incident demands a basic degree of security or management, the second set of attributes may be defined as presented in the "Basic" column. As illustrated in FIG. 4, in some embodiments, the second set of attributes includes one or more incident command system attributes (e.g., incident command system role). The second set of attributes may also identify the incident, such as specifying a type of the incident, a location of the incident, and other static or dynamic identifying data.

Returning to FIG. 3, the incident identity server 110 generates an incident-issued credential for the incident area network 140 (at block 440). The incident-issued credential may include the second set of attributes. In addition or alternatively, the incident-issued credential may include the scope mapped based on the first set of attributes. In some embodiments, the incident identity server 110 may digitally sign the incident-issued credential by cryptographically signing the incident-issued credential with a private key of the incident identity server 110. After generating the incident-issued credential, the incident identity server 110 issues the incident-issued credential to the user device 130. Thereafter, the user device 130 uses the incident-issued credential to access computer-based services available through the incident area network 140.

Figure 5:
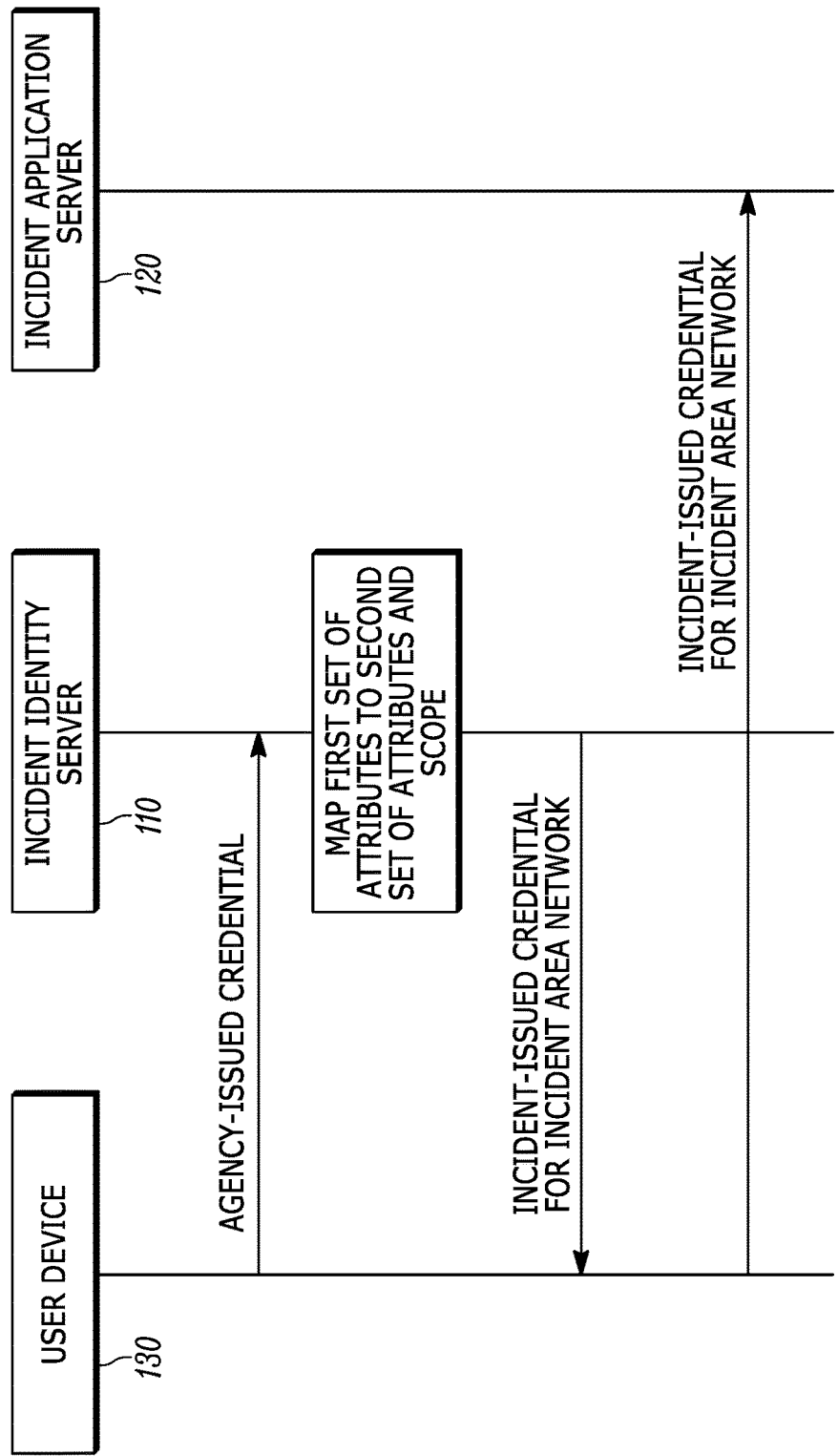
FIG. 5 is a flow diagram illustrating communication between the identity server of FIG. 2, a user device, and an application server in accordance with some embodiments.

For example, FIG. 5 is an operational flow diagram illustrating communication between the user device 130, the incident identity server 110, and the incident application server 120. The user device 130 transmits the agency-issued credential to the incident identity server 110. As described above, the incident identity server 110 maps the first set of attributes included in the agency-issued credential to the second set of attributes and the scope. In particular, as described above, the incident identity server 110 applies one or more mapping rules, tables, or functions to map the first set of attributes (for example, X.509 attributes) to the second set of attributes (for example, incident command system attributes) and the scope. The incident identity server 110 generates the incident-issued credential based on the second set of attributes and the scope and transmits the incident-issued credential to the user device 130. The user device 130 may then transmit the incident-issued credential to the incident application server 120 as part of a request to access computer-based services hosted by the incident application server 120. As noted above, in some embodiments, the incident application server 120 may communicate with the incident identity server 110 to verify data included in a received incident-issued credential.

Figure 6:
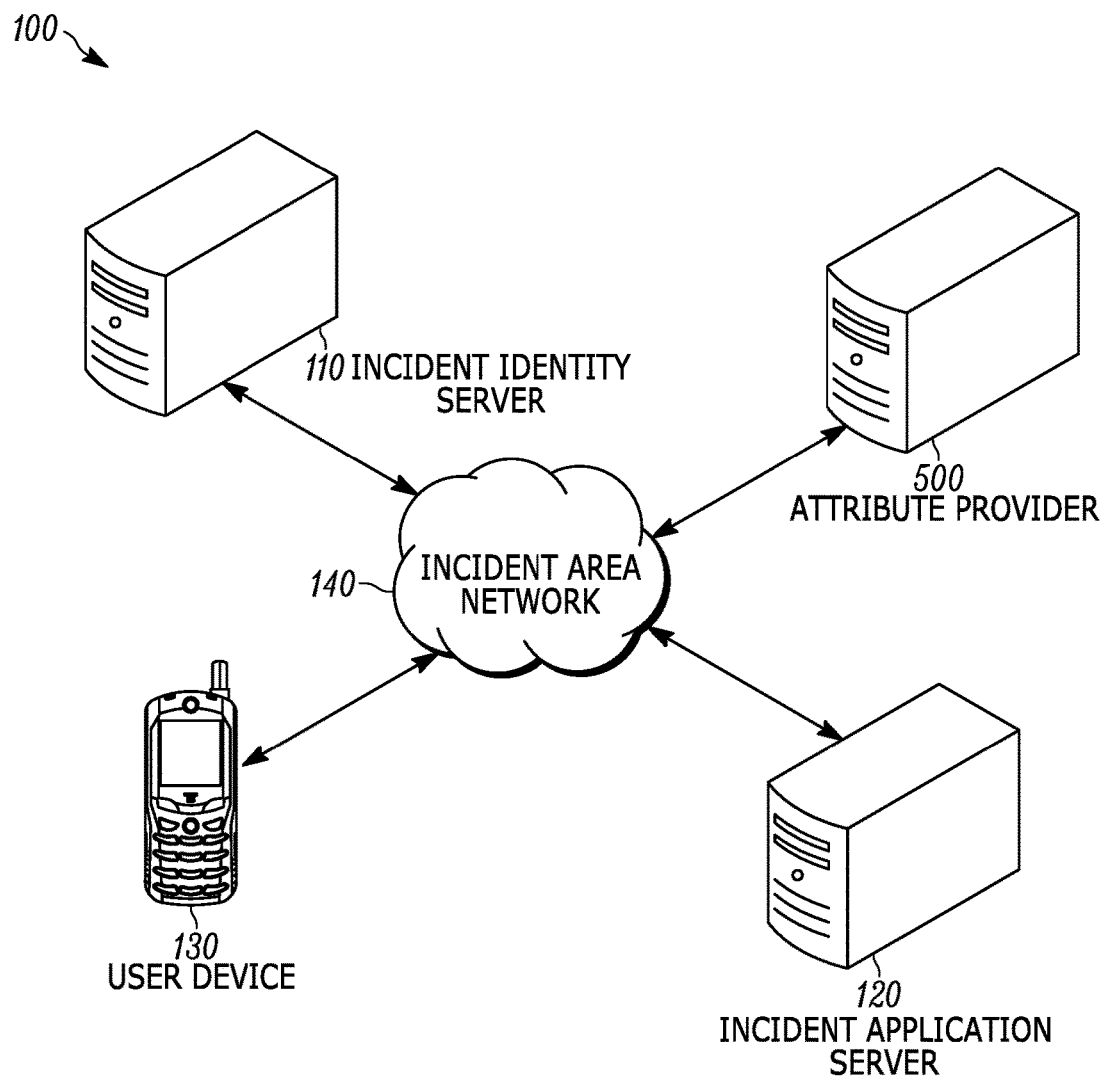
FIG. 6 is a block diagram of the incident area network of FIG. 1 including an attribute provider in accordance with some embodiments.

As illustrated in FIG. 6, the incident identity server 110 may optionally communicate with an attribute provider 500 (for example, a server, database, or a combination thereof). As illustrated in FIG. 6, the incident identity server 110 may communicate with the attribute provider 500 through the incident area network 140. Also, in some embodiments, the attribute provider 500 is included in the incident identity server 110. In other embodiments, the incident identity server 110 may communicate with multiple attribute providers.

The attribute provider 500 tracks what user devices and associated users are using or are authorized to use the incident area network 140. Accordingly, the incident identity server 110 may update the attribute provider 500 with the incident-issued credential generated for the incident area network 140 or attributes or a scope included therein. In some embodiments, the incident identity server 110 updates the attribute provider 500 using the system for cross-domain identity management (SCIM) protocol, an application programming interface, or other mechanisms. In some embodiments, the incident identity server 110 writes the mapped attributes of a user to the attribute provider 500.

In some embodiments, the incident application server 120 may communicate with the attribute provider 500 to verify an incident-issued credential received from the user device 130. Alternatively or in addition, the incident application server 120 may access data managed by the attribute provider 500 to determine authorized users present at the incident associated with the incident area network 140 and their respective attributes (roles and rights), which can be used to manage role assignment and other services. For example, the incident application server 120 may host an incident management service for managing users of the incident area network 140. Also, in some embodiments, the data managed by the attribute provider 500 or a portion thereof may be stored locally on the incident application server 120.

Figure 7:
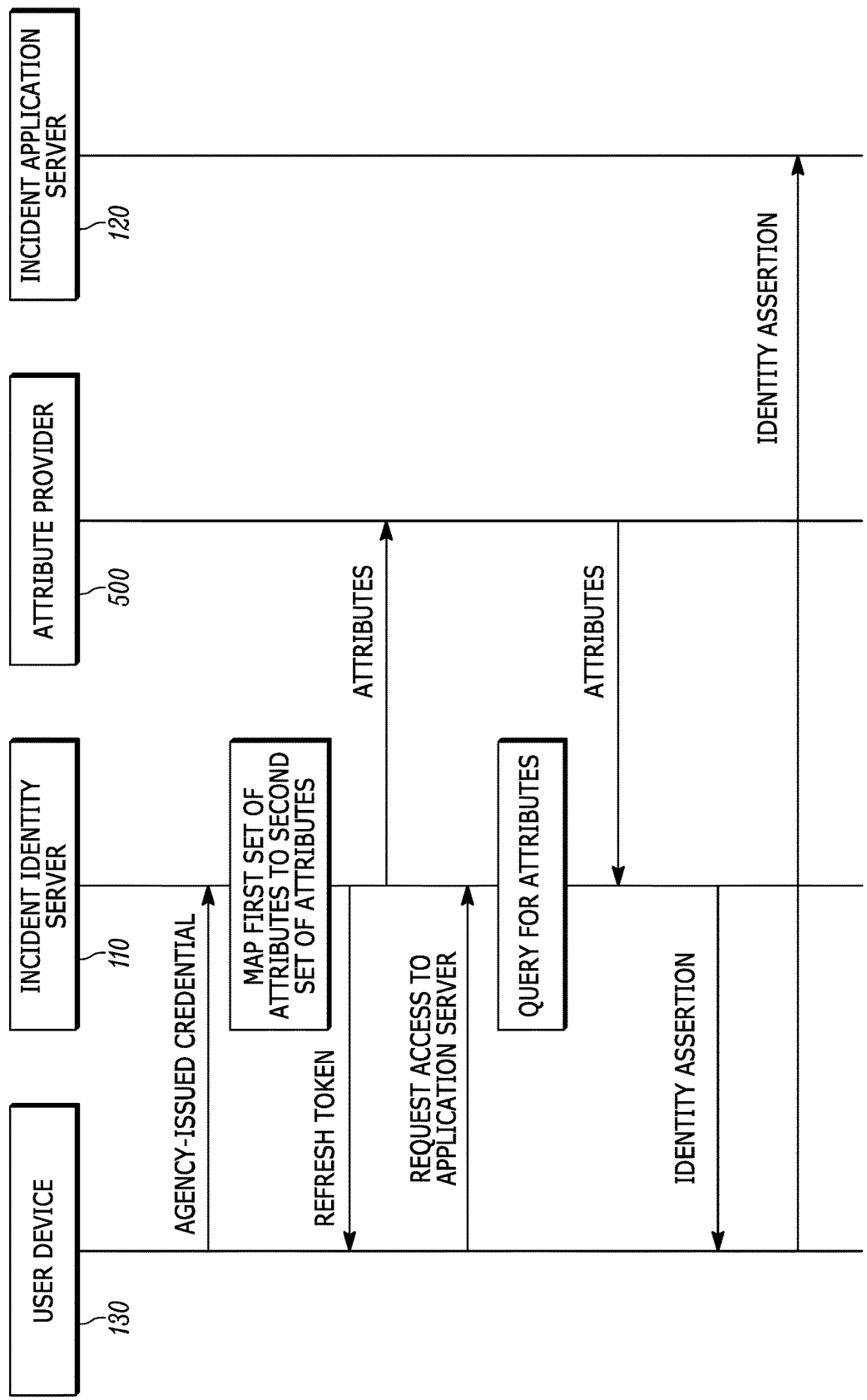
FIG. 7 is a flow diagram illustrating communication between the identity server of FIG. 2, a user device, an application server, and the attribute provider of FIG. 6 in accordance with some embodiments.

Also, in some embodiments, the incident identity server 110 uses the attribute provider 500 to issue initial incident-issued credentials, such as long term access tokens (sometimes referred to as refresh tokens) that allow the user device 130 to subsequently obtain updated or specific incident-issued credentials. For example, FIG. 7 is an operational flow diagram illustrating communication between the user device 130, the incident identity server 110, the attribute provider 500, and the incident application server 120. As illustrated in FIG. 7, the user device 130 transmits the agency-issued credential to the incident identity server 110. The incident identity server 110 maps the first set of attributes included in the agency-issued credential to the second set of attributes as described above. The incident identity server 110 uses the second set of attributes to generate a long term incident-issued credential, such as refresh token, which the incident identity server 110 transmits to the user device 130. The incident identity server 110 also stores the second set of attributes to the attribute provider 500.

After the user device 130 receives the long term incident-issued credential, the user devices transmits a request to the incident identity server 110 to access one or more computer-based services provided by the incident application server 120. The request may include the long term incident-issued credential and also data identifying what services the user device 130 is requesting access to. Upon receiving the request, the incident identity server 110 queries the attribute provider 500 for the previously-determined second set of attributes associated with the user device 130 and generates a short term incident-issued credential, such as an identity assertion. In some embodiments, the short term incident-issued credential is similar to the incident-issued credential as described above that includes a scope and a plurality of attributes, such as incident command system attributes. The scope included in the short term incident-issued credential may specify the rights of the user device 130 (and the user operating the user device) for accessing the requested services. The incident identity server 110 may determine the scope based on the second set of attributes stored in the attribute provider 500 as part of generating the short term incident-issued credential. Alternatively or in addition, the incident identity server 110 may determine the scope as part of generating the long term incident-issued credential and may store the scope with the second set of attributes in the attribute provider 500.

The incident identity server 110 transmits the short term incident-issued credential to the user device 130, which the user device 130 may transmit to the incident application server 120 as part of a request to access computer-based services hosted by the incident application server 120. As noted above, in some embodiments, the incident application server 120 may communicate with the incident identity server 110, the attribute provider 500, or both to verify data included in a received short term incident-issued credential.

As noted above, in some embodiments, functionality performed by the incident identity server 110 may be distributed among multiple devices or electronic processors. For example, in some embodiments, the mapping performed by the incident identity server 110 as described above is performed by an event listener/attribute mapping service provided by the identity server or a separate server. For example, in some embodiments, the user device 130 may request authentication from the incident identity server 110 by providing an agency-issued credential as described above. The incident identity server 110 may be configured to perform initial authentication of the user device 130 as described above based on data included in the agency-issued credential. When the user device 130 is authenticated, the incident identity server 110 may generate an initial incident-issued credential, such as an access token, that includes one or more of the attributes included in the agency-issued credential. The initial incident-issued credential may also include a scope that grants access to the event listener/attribute mapping service. The incident identity server 110 returns the initial incident-issued credential to the user device 130, and the user device 130 transmits the initial incident-issued credential to the event listener/attribute mapping service, which performs the mapping as described above and issues a subsequent incident-issued credential, such as a long term incident-issued credential as described above. Accordingly, in this embodiment, the incident identity server 110 may perform authentication to control what devices access the event listener/attribute mapping service. Also, in some embodiments, the event listener/attribute mapping service stores the mapped attributes (the second set of attributes) and, optionally, the scope to the attribute provider 500. Therefore, the incident identity server 110 may respond to credential requests from the user device 130 directly by accessing the attributes and optional scopes stored in the attribute provider 500. Alternatively or in addition, the user device 130 may request an initial incident-issued credential from the attribute provider 500.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. An identity server comprising:
an electronic processor configured to
  receive an agency-issued credential, wherein the agency-issued credential includes attributes that specify a user device's authenticity, authority, rights, or combination thereof, retrieve a first set of attributes from the agency-issued credential, map the first set of attributes to a scope of a computer-based service available through an incident area network, generate an incident-issued credential for the incident area network including the scope of the computer-based service available through the incident area network, and issue the incident-issued credential to the user device.

2. The identity server of claim 1, wherein the electronic processor is further configured to map the first set of attributes to a second set of attributes, wherein the incident-issued credential includes the second set of attributes.

3. The identity server of claim 2, wherein the second set of attributes includes an incident command system attribute.

4. The identity server of claim 2, wherein the electronic processor is configured to map the first set of attributes to the scope based on the second set of attributes.

5. The identity server of claim 2, wherein the electronic processor is configured to map the first set of attributes to the second set of attributes based on a context of an incident associated with the incident area network, the context including at least one selected from the group consisting of a type of the incident, a size of the incident, a condition of the incident, a location of the incident, a time of day, a number of resources at the incident, a type of resource at the incident, and a needed but missing resource at the incident.

6. The identity server of claim 1, wherein the electronic processor is configured to map the first set of attributes to the scope based on a context of an incident associated with the incident area network, the context including at least one selected from the group consisting of a type of the incident, a size of the incident, a condition of the incident, a location of the incident, a time of day, a number of resources at the incident, a type of resource at the incident, and a needed but missing resource at the incident.

7. The identity server of claim 1, wherein the agency-issued credential is associated with a user of the user device and wherein the electronic processor is further configured to prompt the user device for data identifying the user device and map the first set of attributes to the scope based on the data identifying the user device.

8. The identity server of claim 1, wherein the agency-issued credential is associated with a user of the user device and wherein the first set of attributes includes at least one selected from the group consisting of a level of capability of the user, a level of qualification of the user, and a level of training of the user.

9. The identity server of claim 1, wherein the agency-issued credential is a first agency-issued credential and is associated with a user of the user device and wherein the electronic processor is further configured to receive a second agency-issued credential associated with the user device and wherein the electronic processor is configured to map the first set of attributes to the scope based on the first agency-issued credential and the second agency-issued credential.

10. The identity server of claim 9, wherein the second agency-issued credential includes a third set of attributes, wherein the third set of attributes include at least one selected from the group consisting of a type of the user device, a model number of the user device, an assurance level of the user device, and a security capability of the user device.

11. The identity server of claim 1, wherein the electronic processor is further configured to update an attribute provider based on the scope.

12. An identity server comprising:
an electronic processor configured to
receive an agency-issued credential, wherein the agency-issued credential includes attributes that specify a user device's authenticity, authority, rights, or combination thereof, retrieve a first set of attributes from the agency-issued credential, map the first set of attributes to a second set of attributes based on a context of an incident associated with an incident area network, wherein the second set of attributes specify the user device's authenticity, authority, rights, or combination thereof to access computer-based services available through the incident area network, generate an incident-issued credential for the incident area network associated with the incident including the second set of attributes, and issue the incident-issued credential to the user device.

13. The identity server of claim 12, wherein the context includes at least one selected from the group consisting of a type of the incident, a size of the incident, a condition of the incident, a location of the incident, a time of day, number of resources at the incident, a type of resource at the incident, and a needed but missing resources at the incident.

14. The identity server of claim 12, wherein the agency-issued credential is associated with a user of the user device and wherein the electronic processor is further configured to prompt the user device for data identifying the user device and wherein the electronic processor is configured to map the first set of attributes to the second set of attributes based on the data identifying the user device.

15. The identity server of claim 12, wherein the agency-issued credential is associated with a user of the user device and wherein the first set of attributes includes at least one selected from the group consisting of a level of capability of the user, a level of qualification of the user, and a level of training of the user.

16. The identity server of claim 12, wherein the agency-issued credential is a first agency-issued credential and is associated with a user of the user device and wherein the electronic processor is further configured to receive a second agency-issued credential associated with the user device and wherein the electronic processor is configured to map the first set of attributes to the second set of attributes based on the first agency-issued credential and the second agency-issued credential.

17. The identity server of claim 16, wherein the second agency-issued credential includes a third set of attributes, wherein the third set of attributes include at least one selected from the group consisting of a type of the user device, a model number of the user device, an assurance level of the user device, and a security capability of the user device.

18. The identity server of claim 12, wherein the incident-issued credential includes a long term incident-issued credential and wherein the electronic processor is further configured to receive a request to access a service available through the incident area network, the request including the long term incident-issued credential, query an attribute provider for the second set of attributes, and generate a short term incident-issued credential in response to the request based on the second set of attributes.

19. A method of issuing an incident-issued credential for an incident area network, the method comprising:
receiving, with an identity server, an agency-issued credential, wherein the agency-issued credential includes attributes that specify a user device's authenticity, authority, rights, or combination thereof;

retrieving, with the identity server, a first set of attributes from the agency-issued credential;

mapping, with the identity server, the first set of attributes to a second set of attributes based a context of an incident associated with the incident area network, wherein the second set of attributes specify the user device's authenticity, authority, rights, or combination thereof to access computer-based services available through the incident area network;

generating the incident-issued credential based on the second set of attributes; and issuing, with the identity server, the incident-issued credential to the user device.

20. The method of claim 19, wherein the context includes at least one selected from the group consisting of a type of the incident, a size of the incident, a condition of the incident, a location of the incident, a time of day, number of resources at the incident, a type of resource at the incident, and a needed but missing resource at the incident.

\* \* \* \* \*